US012775950B2

(12) United States Patent
Raw et al.

(10) Patent No.: US 12,775,950 B2
(45) Date of Patent: Oct. 27, 2026

(54) SYSTEM, METHODS, AND DEVICES FOR PAYMENT RECOVERY PLATFORM

(71) Applicant: ROYAL BANK OF CANADA, Montreal (CA)

(72) Inventors: Jake Traub Raw, Toronto (CA); Dorothy Ging Zi Ng, Toronto (CA); Phoebe Chloe Sy Dyloco, Toronto (CA); Ralph George Maamari, Toronto (CA); Rami Thabet, Toronto (CA); Izayana Navas, Toronto (CA); Alex Tak Kwun Lau, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 243 days.

(21) Appl. No.: 16/541,920

(22) Filed: Aug. 15, 2019

(65) Prior Publication Data

US 2020/0058025 A1 Feb. 20, 2020

Related U.S. Application Data

(60) Provisional application No. 62/764,733, filed on Aug. 15, 2018.

(51) Int. Cl.
*G06Q 20/40* (2012.01)
*G06F 18/23* (2023.01)
(Continued)

(52) U.S. Cl.
CPC ......... *G06Q 20/4016* (2013.01); *G06F 18/23* (2023.01); *G06F 18/2431* (2023.01);
(Continued)

(58) Field of Classification Search
CPC ... G06Q 20/401; G06Q 20/102; G06K 9/6218
See application file for complete search history.

(56) References Cited

U.S. PATENT DOCUMENTS 4,879,747 A * 11/1989 Leighton ................ G06Q 20/40 235/382
8,463,772 B1 * 6/2013 Aminzade ........... G06F 16/9537 707/723

(Continued)

FOREIGN PATENT DOCUMENTS

CA 3034939 A1 * 10/2019 ......... G06Q 20/3223
WO WO-2015164910 A1 * 11/2015 ......... G06F 16/2455

(Continued)

OTHER PUBLICATIONS

Federal Register, Electronic Fund Transfers (Regulation E), Feb. 7, 2012. Available at: https://www.federalregister.gov/documents/2012/02/07/2012-1728/electronic-fund-transfers-regulation-e (Year: 2012).*

(Continued)

*Primary Examiner* — Nilesh B Khatri
*Assistant Examiner* — Yin Y Choi
(74) *Attorney, Agent, or Firm* — NORTON ROSE FULBRIGHT CANADA LLP

(57) ABSTRACT

Embodiments relate to systems and methods for intercepting potentially erroneous electronic transaction data processing tasks. The system includes a memory and processor configured for: receiving a processing task data set including at least one parameter for executing an electronic transaction data processing task; providing, to a multi-class classifier, an input data set with the at least one parameter for executing the electronic transaction data processing task and at least one data feature associated with a user profile to generate a classification probability output for each class in the multi-class classifier; and when none of the classification probability outputs meet a threshold condition, preventing execution of the electronic transaction data processing task.

16 Claims, 3 Drawing Sheets

(51) Int. Cl.
*G06F 18/2431* (2023.01)
*G06Q 20/10* (2012.01)

(52) U.S. Cl.
CPC ......... *G06Q 20/102* (2013.01); *G06Q 20/401* (2013.01); *G06Q 20/407* (2013.01)

(56) References Cited

U.S. PATENT DOCUMENTS

| | | | | |
|---|---|---|---|---|
| 9,510,154 | B2* | 11/2016 | Mori | G01S 19/05 |
| 9,595,031 | B1* | 3/2017 | Grassadonia | G06Q 20/326 |
| 9,690,938 | B1* | 6/2017 | Saxe | G06N 20/00 |
| 9,886,461 | B1* | 2/2018 | Sharifi | G06Q 10/1097 |
| 10,373,140 | B1* | 8/2019 | Chang | G06Q 20/14 |
| 10,832,248 | B1* | 11/2020 | Kramme | G06Q 30/0185 |
| 11,062,214 | B2* | 7/2021 | Jarrett | G06N 20/00 |
| 11,222,314 | B2* | 1/2022 | Leber | G06Q 20/385 |
| 11,295,283 | B1* | 4/2022 | Hecht | G06Q 20/4037 |
| 11,556,936 | B1* | 1/2023 | Fisher | G06Q 20/353 |
| 11,900,376 | B2* | 2/2024 | Ozvat | G06Q 20/202 |
| 2002/0057283 | A1* | 5/2002 | Biswas | G06F 16/9537 707/999.001 |
| 2002/0059226 | A1* | 5/2002 | Cooper | G06F 16/29 |
| 2003/0172014 | A1* | 9/2003 | Quackenbush | G06Q 40/00 705/35 |
| 2005/0144148 | A1* | 6/2005 | Hatonen | H04L 41/142 706/12 |
| 2006/0058958 | A1* | 3/2006 | Galbreath | G06F 16/29 703/3 |
| 2007/0211871 | A1* | 9/2007 | Sjolander | H04M 1/72457 379/133 |
| 2007/0279490 | A1* | 12/2007 | Zhou | G06K 9/00771 348/143 |
| 2008/0097938 | A1* | 4/2008 | Guyon | G06N 20/10 706/12 |
| 2008/0109392 | A1* | 5/2008 | Nandy | G06Q 30/018 706/47 |
| 2009/0191898 | A1* | 7/2009 | Lewis | H04W 4/02 455/456.3 |
| 2010/0022253 | A1* | 1/2010 | Magnusson | G06Q 30/02 455/456.3 |
| 2011/0264612 | A1* | 10/2011 | Ryman-Tubb | G06Q 20/4016 706/12 |
| 2012/0047080 | A1* | 2/2012 | Rodatos | G06Q 10/30 705/308 |
| 2012/0251008 | A1* | 10/2012 | Nowozin | G06K 9/6231 382/195 |
| 2013/0080318 | A1* | 3/2013 | Katz | G06Q 40/02 705/39 |
| 2013/0103373 | A1* | 4/2013 | Benayon | G06Q 10/067 703/6 |
| 2013/0311362 | A1* | 11/2013 | Milam | G06Q 30/04 705/40 |
| 2014/0279311 | A1* | 9/2014 | Just | G06Q 40/12 705/30 |
| 2015/0032600 | A1* | 1/2015 | Castinado | G06Q 20/10 705/39 |
| 2015/0130845 | A1* | 5/2015 | Otero | G06T 15/30 715/781 |
| 2015/0278813 | A1* | 10/2015 | Yue | G06Q 20/085 705/44 |
| 2016/0019465 | A1* | 1/2016 | Milton | H04W 4/029 706/52 |
| 2016/0110762 | A1* | 4/2016 | Mastierov | G06F 40/131 707/739 |
| 2016/0180229 | A1* | 6/2016 | Agarwal | G06Q 30/0201 706/47 |
| 2016/0275152 | A1* | 9/2016 | Gunjan | G06F 16/355 |
| 2016/0275594 | A1* | 9/2016 | Mullakkara Azhuvath | G06F 16/248 |
| 2017/0039222 | A1* | 2/2017 | Farrow | G06F 16/29 |
| 2017/0053282 | A1* | 2/2017 | Olumofin | G06Q 20/3224 |
| 2017/0083825 | A1* | 3/2017 | Battersby | G06N 20/10 |
| 2017/0109509 | A1* | 4/2017 | Baghdasaryan | G06Q 20/40 |
| 2017/0116330 | A1* | 4/2017 | He | G06F 16/334 |
| 2017/0162006 | A1* | 6/2017 | Sahadi | H04B 1/385 |
| 2017/0171795 | A1* | 6/2017 | Wang | H04L 63/107 |
| 2017/0186032 | A1* | 6/2017 | Rangasamy Kannadasan | G06Q 30/0248 |
| 2017/0195359 | A1* | 7/2017 | Grigoryan | G06F 3/04842 |
| 2017/0195436 | A1* | 7/2017 | Grigoryan | G06Q 40/025 |
| 2017/0278015 | A1* | 9/2017 | Miranda | G06N 20/00 |
| 2017/0330099 | A1* | 11/2017 | de Vial | G06F 11/0721 |
| 2018/0074786 | A1* | 3/2018 | Oberbreckling | G06F 16/2255 |
| 2018/0137303 | A1* | 5/2018 | Farkash | G06F 21/6263 |
| 2019/0012733 | A1* | 1/2019 | Gorman | G06Q 40/12 |
| 2019/0164159 | A1* | 5/2019 | Ponniah | G06Q 20/407 |
| 2019/0385175 | A1* | 12/2019 | Chamberlain | G06Q 30/0185 |
| 2020/0005270 | A1* | 1/2020 | Griffith | G06Q 20/227 |
| 2020/0005310 | A1* | 1/2020 | Kumar | G06Q 40/00 |

FOREIGN PATENT DOCUMENTS

| | | | | |
|---|---|---|---|---|
| WO | WO-2016019093 | A1* | 2/2016 | G06F 21/316 |
| WO | WO-2016141491 | A1* | 9/2016 | G06F 16/164 |

OTHER PUBLICATIONS

Zimek et al., “Frequent Pattern Mining Algorithms for Data Clustering”, 2014, pp. 403-423. Available at: https://eda.mmci.uni-saarland.de/pubs/2014/fpmbook_clus-zimek,assent,vreeken.pdf. (Year: 2014).*

Han et al., “Data Mining Concepts and Techniques”, 2016. Available at: http://myweb.sabanciuniv.edu/rdehkharghani/files/2016/02/The-Morgan-Kaufmann-Series-in-Data-Management-Systems-Jiawei-Han-Micheline-Kamber-Jian-Pei-Data-Mining.-Concepts-and-Techniques-3rd-Edition-Morgan-Kaufmann-2011.pdf. (Year: 2016).*

John Steensen, “Machine Learning in the Payments Industry”, May 2018, 34 pages. Available at: https://usa.visa.com/dam/VCOM/global/support-legal/documents/webinar-machine-learning.pdf. (Year: 2018).*

* cited by examiner

200

SYSTEM, METHODS, AND DEVICES FOR PAYMENT RECOVERY PLATFORM

CROSS-REFERENCE TO RELATED APPLICATIONS

This application claims all benefit including priority to U.S. Provisional Patent Application 62/764,733, filed Aug. 15, 2018, and entitled, "SYSTEM, METHODS, AND DEVICES FOR PAYMENT RECOVERY PLATFORM", the entirety of which is hereby incorporated by reference.

FIELD

Embodiments herein described relate to computer-implemented financial platforms and, specifically, to systems, methods, and devices for payment recovery platforms.

BACKGROUND

Electronic banking generates large volumes of transaction data processes. These data processes can include processes for causing the transfer of funds, for example, as part of an electronic bill payment process.

Bill payment data processes can be triggered by data received from large number of data sources such as electronic devices associated with users. Mistakes in user-inputted data can trigger unwanted data processes and can result in wasted resources to stop or reverse these data processes.

SUMMARY

Data processing tasks such as tasks relating to electronic transactions, for example electronic bill payments, can have parameters such as payment amounts and payment dates which are inconsistent or varied from period to period. In some situations, such variances and user inputs can lead to time consuming and costly errors. In some embodiments, aspects of the present disclosure provide a technical system for identifying and/or intercepting potentially erroneous electronic transaction data processing tasks.

In accordance with one aspect, there is provided a computer-implemented system for intercepting potentially erroneous electronic transaction data processing tasks. The system includes a processor and a memory storing machine executable instructions to configure the processor for: receiving a processing task data set including at least one parameter for executing an electronic transaction data processing task; providing, to a multi-class classifier, an input data set with the at least one parameter for executing the electronic transaction data processing task and at least one data feature associated with a user profile to generate a classification probability output for each class in the multi-class classifier; and when none of the classification probability outputs meet a threshold condition, preventing execution of the electronic transaction data processing task.

In accordance with another aspect, there is provided a method for intercepting potentially erroneous electronic transaction data processing tasks. The method includes receiving a processing task data set including at least one parameter for executing an electronic transaction data processing task; providing, to a multi-class classifier, an input data set with the at least one parameter for executing the electronic transaction data processing task and at least one data feature associated with a user profile to generate a classification probability output for each class in the multi-class classifier; and when none of the classification probability outputs meet a threshold condition, preventing execution of the electronic transaction data processing task.

In accordance with another aspect, there is provided a computer-readable medium or media having stored thereon machine-interpretable instructions, which when executed by a processor, configured the processor for: receiving a processing task data set including at least one parameter for executing an electronic transaction data processing task; providing, to a multi-class classifier, an input data set with the at least one parameter for executing the electronic transaction data processing task and at least one data feature associated with a user profile to generate a classification probability output for each class in the multi-class classifier; and when none of the classification probability outputs meet a threshold condition, preventing execution of the electronic transaction data processing task.

Embodiments described herein can provide a platform, device and process for payment recovery. In particular, embodiments described herein provides a platform, device and process for assessing financial transactions, including bill payments, for correctness.

In accordance with one aspect, there is provided a computer-implemented system for generating a payment recovery platform for financial data comprising a processor and a memory storing machine executable instructions to configure the processor to: receive financial data; extract features from the financial data, wherein the features comprise one or more time indicators, first pattern indicators for a first entity in relation to a first payor, and second pattern indicators for a second payor in relation to a second entity; generate a classification using one or more classification models based on the features; and determine one or more incorrect characteristics of a financial interaction using the classification.

A computer-implemented method for generating a payment recovery platform for financial data, the method comprising: receiving financial data; extracting features from the financial data, wherein the features comprise one or more time indicators, first pattern indicators for a first entity in relation to a first payor, and second pattern indicators for a second payor in relation to a second entity; generating a classification using one or more classification models based on the features; and determining one or more incorrect characteristics of a financial interaction using the classification.

A computer-readable medium storing machine-interpretable instructions, which when executed by a processor, cause the processor to perform a method for generating payment recovery platform for financial data, the method comprising: receiving financial data; extracting features from the financial data, wherein the features comprise one or more time indicators, first pattern indicators for a first entity in relation to a first payor, and second pattern indicators for a second payor in relation to a second entity; generating a classification using one or more classification models based on the features; and determining one or more incorrect characteristics of a financial interaction using the classification.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
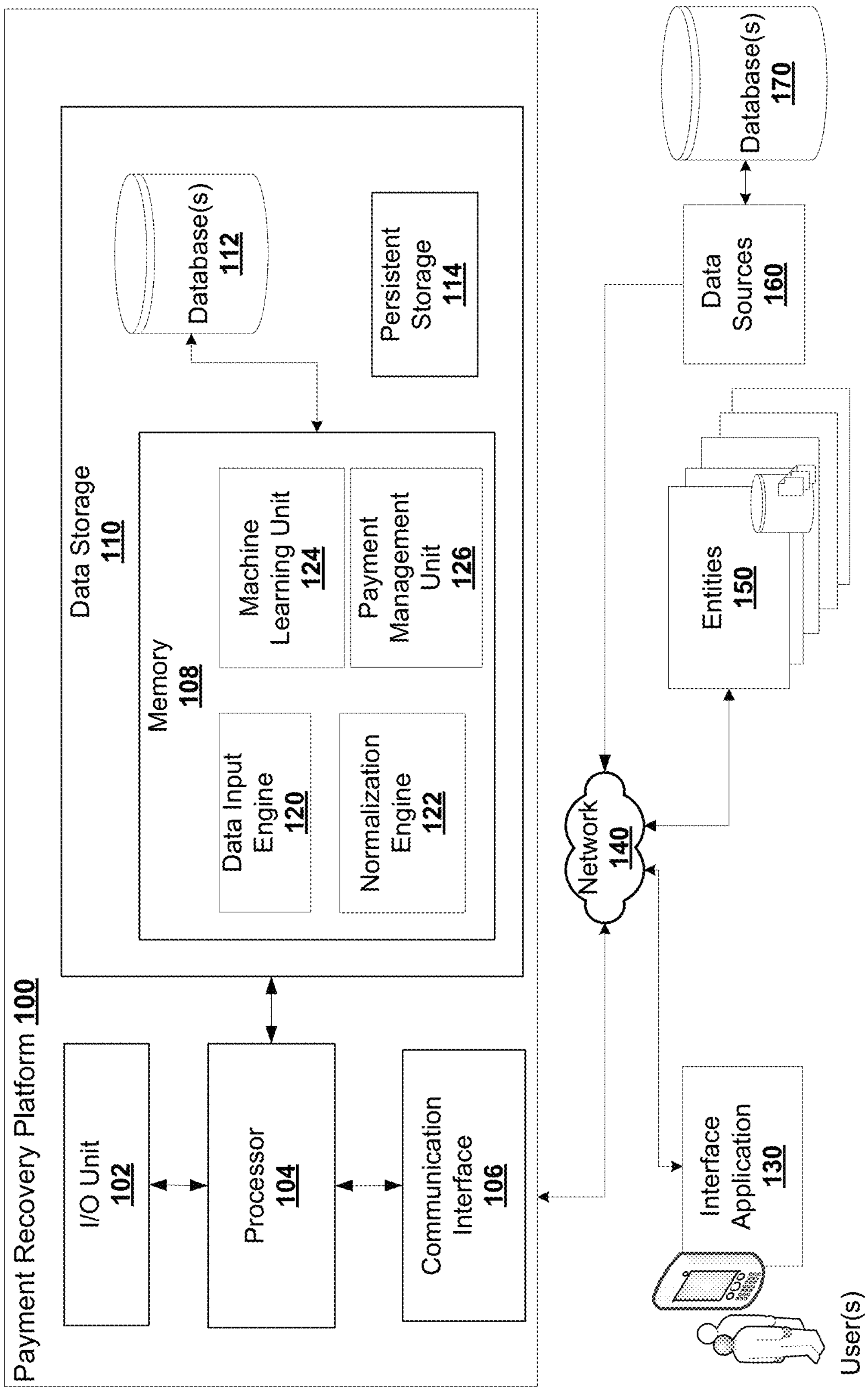
FIG. 1 is a schematic diagram of an example payment recovery platform according to some embodiments.

A technical challenge with computers may be faced in enabling the automation, simplification of review, and/or correction of incorrect electronic interactions (e.g., electronic payments, transfers, and/or transactions, such as bill payments). As described herein, bill payments or payment recovery may be used as examples electronic interactions, but it will be understood that other systems and processes described herein can be applied to other electronic interactions.

Embodiments of systems and processes described herein can automate and/or simplify a payment recovery process for incorrect bill payments, for example, by enabling a computer system to permit such functions or enhance or transform a process that may otherwise take a greater length of time, be susceptible to error (e.g., greater error or greater susceptibility), and/or may contain errors that are not detected. Embodiments of a system described herein can use machine learning to train and/or generate models for classification or prediction of one or more attributes, for example, recognizing payment-related patterns of a user (e.g., a payee or payor) or recognizing payment-related patterns amongst users (e.g., types of payments made by multiple payees to a single payor). Payment patterns can include typical (or other threshold appropriateness indicator) account numbers, transaction amounts, transaction participants, temporal indicators (e.g., time, date, relative temporal indicators such as order of transactions completed or processed), location, other attribute, and/or combination of same, for example, across one or more players (e.g., payors, payees) or actions (e.g., transactions, payments). In some embodiments, the classification models are trained on one or more of the following extracted features from data: payee, payor, amount paid, account number paid to, and/or, for training purposes, the type of error (e.g., incorrect account, amount, or payor) associated with the data.

An alternative bill payment recovery process could result in a loss of valuable time and money and not provide an ability to determine or generate various computer models that can be used to predict or generate certain results. This can impact corporate creditors by preventing them from reconciling their accounts in good time, which can in turn lead to poor customer satisfaction. Further, a user interface is improved, facilitating user engagement with one or more access points (e.g., dashboards) of a payment recovery platform 100.

Systems and processes described herein can provide improved computer functionality for determining appropriate transaction or payment parameters, using one or more generated and tailored computer models.

In some embodiments, there is provided a system and processes to facilitate the transformation (e.g., collecting, parsing, storing, indexing logs for future use and/or dynamically unifying data from separate sources), storage (e.g., distributed search and analytics engine) and analyzation (e.g., classification as to a type of incorrect transaction such as wrong account, wrong amount, or wrong payor) of bill payments for pattern processing based on factors (e.g., extracted features from the data), including: 1) time (e.g., date of bill payment), 2) individual's previous patterns of that payor, and 3) payee's or payor's patterns (e.g., variance, using average variance). The time can include the month a bill payment was made and can be used to cluster bill payments together using machine learning; an individual's previous patterns of that payor can be used to generate a self-variance (e.g., using a machine learning model) on previous payments that the payee has made to the payor; and the payee's or payor's patterns can be used to generate a cross-variance (e.g., using a machine learning model) on the payor's payment with all the payee's received payments for a particular month. Machine learning can be used to generate one or more trained classification models from which self-variance, cross-variance, or other data representations can be generated, extracted, or determined. The system can use such results (e.g., classifications) to identify and correct data provided by a user (e.g., during an attempt to make a bill payment, for example) and/or facilitate provision of data to a computer by configuring a particular arrangement of interface elements (e.g., particular ordering or configuration of data values for selection, where the ordering or confirmation is based on likelihood of applicability or correctness).

For example, in some embodiments, factors or features generated and/or used by the system and processes described herein to determine correct or incorrect attributes of electronic transactions are 1) date and time of bill payment, 2) an individual's bill payment history, and 3) payee's received payments. The system can use the date and time of bill payment data to cluster the bill payments together based on month, time, and date. The system can use data relating to an individual's bill payment history to execute a self-variance on previous payments that a payor has made to a payee. The system can use data relating to a payee's received payments to execute a cross-variance on the payor's payment with the payee's received payments on a monthly basis.

In some embodiments, system and processes described herein receive, manage, update, and/or generate data related to electronic bill payments passing through a financial institution; provide an ability to detect payment variances or variances in payees (e.g., that payors have provided, for example, through a mobile banking application); use one or more predictive models (in some embodiments, with logistical regression); and provide business value through technical computer improvements that can increase client experience and increase savings through a reduction in call times on support lines and investigation load in addressing incorrect bill payments.

In some embodiments, systems and processes described herein can generate tagged bill payment data to mark same as incorrect based on account, payee, and/or amount.

In some embodiments, payment recovery platform 100 is configured to receive and/or process data. Data can include, for example, bill payments passing through a bank system.

In some embodiments, payment recovery platform 100 is configured to implement various features. For example, a feature can be an ability to detect wrong amounts or account numbers that payors have inputted on a mobile application 130. In some embodiments, payment recovery platform 100 is configured to detect wrong payees using geo-location cluster analysis. In some embodiments, payment recovery platform 100 is configured to detect incorrect numerical data, recipient or sender identity, and/or attribute data received (e.g., at an interface application) for an electronic interaction.

In some embodiments, payment recovery platform 100 is configured to use one or more models, such as, predictive models (e.g., using logistical regression).

In some embodiments, payment recovery platform 100 is configured to provide improved business advantages through improved technological interface(s) or platforms. For example, payment recovery platform 100 can provide increased client experience and increased savings through a reduction in call center load in relation to fixing incorrect bill payments.

FIG. 1 is a schematic diagram of an example payment recovery system 100 according to some embodiments. The platform 100 can include an I/O Unit 102, a processor 104, communication interface 106, and data storage 110, and/or one or more of same. The processor 104 can execute instructions in memory 108 to implement aspects of processes described herein. The processor 104 can execute instructions in memory 108 to configure data input engine 120, normalization engine 122, machine learning unit 124, payment management unit 126, and other functions described herein.

In some embodiments, data input engine 120 is configured to receive data (e.g., financial data). In some embodiments, data input engine 120 is configured to receive labeled examples and provide same to normalization engine 122, which can be configured to process, normalize, and/or manipulate the data so as to provide data or facilitate the use of data for machine learning unit 124. Data input engine 120 can receive data sets from interface application 130, databases 112 (e.g., local databases), entities 150 (e.g., remote entities), and/or data sources 160 (e.g., over a network). Data input engine 120 can receive data sets from machine learning unit 124 and/or payment management unit 126 or data originating from same (e.g., stored in persistent storage 114). This can enable a feedback mechanism for machine learning unit 124 to refine one or more models to improve classification accuracy, for example.

In some embodiments, normalization engine 122 is configured to process the data, for example, apply one or more normalization parameters on the data to generate data suitable for machine learning unit 124 to perform its function(s). In some embodiments, normalization engine 122 is configured to rearrange, organize, and/or store the data or portions thereof. For example, normalization engine 122 can be configured to generate one or more models representing one or more patterns in the data or generate data that can be used to generate same. An example model can be a self-variation model (e.g., representing one or more patterns within a single modality such as a payor, a payee, or a transaction type) or a cross-variation model (e.g., representing one or more patterns across more than one modality, including in relation to another modality, for example, patterns of multiple payees in relation to a single payor or patterns of transaction types in relation to a single payor).

In some embodiments, normalization engine 122 is configured to receive data from input engine 120 and update and/or manipulate data or generate new data (e.g., meta data) or enable (e.g., facilitate) new data to be generated from same. For example, normalization engine 122 can organize the data or selectively store the data in one or more different data structures that may help optimize retrieval or use. As an example, normalization engine 122 can be configured to identify and extract certain data (e.g., data that may be particularly useful for machine learning unit 124 during training or classification). In some embodiments, normalization engine 122 is configured to generate clean data comprised of an input data set with certain formatting, tags, inconsistencies, or unusable data elements removed.

Example data (e.g., to be used for training data) stored as a JSON object (key/value pairs) follows:

```
{
    “took”: 6,
    “timed_out”: false,
    “_shards”: {
        “total”: 5,
        “successful”: 5,
        “skipped”: 0,
        “failed”: 0
    },
    “hits”: {
        “total”: 1,
        “max_score”: 10.2147455,
        “hits”: [
            {
                “_index”: “tel_bkg_pymnt”,
                “_type”: “tel_bkg_pymnt”,
                “_id”: “weVn7GQBi9rW04w7OA1c”,
                “_score”: 10.2147455,
                “_source”: {
                    “PYMNT_TIME”: “09:58:07”,
                    “TRAN_TYPE”: “PAY”,
                    “ACCT_NO”: “1234567”,
                    “REF_NO”: “123456”,
                    “RETURN_CD”: “0”,
                    “FUNC”: null,
                    “TRANSIT”: “123”,
```

-continued

"USRID": null,
"COMP_ID": "1234",
"BILLIN_IND": "Y",
"PYMT_ACCT": "12345678901",
"PRT_POST_IND": "N ",
"message": "some big ass text we dont need",
"@version": "1",
"AR_ID": "big ass number we dont need",
"INVOICE_NO": null,
"SRVC_ID": "12",
"SNAP_DT": "2018/07/29",
"ACCT_TYPE": "SAV",
"@timestamp": "2018-07-30T18:15:43.432Z",
"SEQ_NO": "12",
"EFF_DATE": "2018/07/29",
"AGENT_ID": "ABCD ",
"FNCL_TR_NO": "123",
"CHNL_CD": "OLB ",
"AMT": "420.69",
"path": """"C:\Users\324589571\Desktop\amp\data\EDW-pipe-files\TEL_BKG_PYMNT_desc_pipe.csv"""",
"host": "qwerqwer",
"FILE_CREAT_DT": "?"
}
}
]
}
}

In some embodiments, machine learning unit 124 is configured to extract features from the data (e.g., financial data), wherein the features comprise one or more time indicators, first pattern indicators for a first entity in relation to a first payor, and second pattern indicators for a second payor in relation to a second entity. The machine learning unit 124 is configured to train one or more classification models using the data (e.g., the extracted features). In some embodiments, the first payor and the second payor are the same payor.

In some embodiments, machine learning unit 124 is configured to generate a classification using one or more classification models based on the features and determine one or more incorrect characteristics of a data relationship (e.g., representing a financial interaction) using the classification. In some embodiments, the one or more incorrect characteristics is an amount or an account number. In some embodiments, the one or more incorrect characteristics may be of data inputted by a user (or originating from a user) or may be data that represents potential financial interactions. The payment recovery platform 100 may iterate through potential financial interactions and select one or more values from financial interactions that are determined to not have one or more incorrect characteristics. The payment recovery platform 100 may then present those one or more values to a user for selection. In this way, the payment recovery platform 100 may facilitate or improve accuracy of data input, for example, of critical financial interactions (e.g., bill payments). The payment recovery platform 100 can be used to generate an interface configured based on the classification, for example, to provide potentially suitable data values for selection by a user.

In some embodiments, the one or more classification models can be self variation models and/or a cross variation models. In some embodiments, a first classification model of the one or more classification models generates a classification based on self variation. In some embodiments, a second classification model of the one or more classification models generates a classification based on cross variation.

In some embodiments, machine learning unit 124 is configured to cluster data or portions thereof based on one or more features extracted, such as a time indicator associated with a particular transaction (e.g., bill payment). Clustering may provide a step before further machine learning to detect other patterns in data. Feature extraction may be performed on a clustered dataset (including related data and meta data), for example.

In some embodiments, machine learning unit 124 is configured to adjust the classification model based on feedback. The adjustment can be tailoring or updating weightings associated with nodes in a classification model, for example, and can be based on data relating to appropriate (e.g., correct) classifications or predictions or other data (e.g., data relating to a new payment, for example). In some embodiments, this data is provided by a user (e.g., a payee or payor engaged with payment recovery platform 100), for example, and received by data input engine 120 as data entered into a field in a form.

In some embodiments, machine learning unit 124 is configured to provide data recency and training consistency. For example, data recency can be provided by real-time training (e.g., batch training) and training consistency can be provided by an evaluation mechanism (e.g., online evaluation, offline evaluation). The evaluation mechanism can include a feedback loop that may include user input (e.g., correction) or data results from machine learning unit 124. In some embodiments, machine learning unit 124 is configured to receive one or more training sets (e.g., training parameters of a model) and use same to train one or more classification models, for example, to recognize patterns (e.g., self variation, cross variation) across or within one or more data sets. The training sets can include tags or data indicators that denote a correct classification type, which machine learning unit 124 can use to train one or more classification models. Machine learning unit 124 may extract one or more training parameters from one or more data sets to generate one or more training sets. In some embodiments, machine learning unit 124 is configured to receive and/or generate an evaluation set and, for example, use same to tune or refine (e.g., re-train) parameters or hyper parameters of one or more models. For example, data representing hyper parameters can be converted from a particular data structure and/or database table (e.g., relational database table) to a JSON object, for example. In some embodiments, machine learning unit 124 is configured to receive and/or generate a testing set and, for example, evaluate results of same. The results may be used to further refine, tune, and/or re-train one or more classification models, for example, to improve accuracy of classification or prediction.

In some embodiments, machine learning unit 124 is configured to evaluate classification accuracy through a user-feedback process. For example, a payor who is in the process of submitting an electronic bill payment may receive a notification via an interface application where machine learning unit 124 or payment management unit 126 detects an error, where the payor will dismiss the proposed correction (e.g., classification) or accept the proposed correction and modify the bill payment.

As another example, a payee who is in the process of reconciling a bill payment can report, via interface application 130, bill payments they cannot reconcile. This data input can be received by machine learning unit 124 and one or more classification models can be improved for increased accuracy for a next electronic bill payment.

In some embodiments, machine learning unit 124 is configured to train one or more classification models using bill payment data stored in an electronic data warehouse, for example, using a test data set and a validation data set to enable the models to detect incorrect and correct information.

In some embodiments, machine learning unit 124 is configured to implement real-time data training. In some embodiments, machine learning unit 124 is configured to train one or more models without hyper parameters. In some embodiments, machine learning unit 124 is configured to train one or more models from data where data values for Payor, Payee, Amount Paid, and Account Number paid to are consistently available or are appropriately structured by normalization engine 122 prior to provision to machine learning unit 124. In some embodiments, during training, an error type data value may be used in the data.

In some embodiments, machine learning unit 124 is configured to use one or more training parameters to build one or more models. The training parameters can be Payee, Payor, Amount Paid (e.g., Amount of Bill Payment), Account Number paid to (e.g., Utility Company X Internet (1002482090) vs Utility Company X Cell (1009482396)), and Error Type (Wrong Account, Wrong Amount, Wrong Payor).

In some embodiments, machine learning unit 124 is configured to use one or more training parameters to evolve (e.g., re-train, fine-tune) one or more models. The training parameters can be Payee, Payor, Amount Paid (Amount of Bill Payment), and Account Number paid to (e.g., Utility Company X Internet (1002482090) vs Utility Company X Cell (1009482396)). In these embodiments, machine learning unit 124 can be configured to classify a Bill Payment and then validate it against user input (e.g., user accepts that they made a mistake through a mobile notification pop-up; corporate creditor clicks on an interface dashboard to say that they could not process the bill payment and/or indicate what the error was).

In some embodiments, machine learning unit 124 is configured to extract, train using, and/or classify data based on features, where the features are defined as: (Input Variables: {date of bill payment, a list of bill payments from X payor to X payee, a list of bill payments in the month of analysis to X payee from !X payors). For example, the features can include a time indicator of a transaction, an attribute of a pattern in data relating to a particular payor, and an attribute of a pattern in data relating to a particular payee. The patterns can be determined by machine learning unit 124 using one or more classification models and based on a predicted correct data attribute or classification. In this way, machine learning unit 124 may generate one or more classifications or predictions based on one or more previous classifications or predictions. In some embodiments, machine learning unit 124 may generate one or more classifications or predictions without using previous classifications or predictions. For example, machine learning unit 124 can be configured to predict the correct date for a next bill payment from a particular payee to a particular payor based on bill payment patterns of that payor to that payee as well as bill payment patterns of other payors to that same payee and the date of the bill payment to be evaluated for correctness.

In some embodiments, machine learning unit 124 is configured to generate one or more models to make predictions or classifications based on a payor's (or, in some embodiments, sender of an electronic interaction) previous patterns with respect to a payee (or, in some embodiments, recipient of an electronic interaction) or a payee's patterns with respect to other payors. In some embodiments, machine learning unit 124 is configured to enable clustering of payors (e.g., when determining a payee's patterns with respect to other payors). In some embodiments, machine learning unit 124 is configured to generate one or more models to make predictions or classifications based on time, payor's previous patterns for that payee, and payee's patterns with respect to other payors.

In some embodiments, machine learning unit 124 is configured to train one or more models using a training data set and validation data set using online learning (e.g., real-time feedback from users such as payors or payees). In some embodiments, machine learning unit 124 is configured to improve the models, for example, where the models generated an incorrect classification (e.g., payment amount was correct when the model generated an amount that was used by payment management unit 126 to indicate that the payment amount was incorrect). For example, machine learning unit 124 can increase its variance detection range or classify the data as an outlier and ignore the data depending on the data context, history of bill payments, and/or future of bill payments. As an illustration, where the sequence of bill payment is 20, 25, 23, 80, machine learning unit 124 can be configured to increase the variance range of one or more models but if the sequence becomes 20, 25, 23, 80, 27, 19, 21 in the future, then machine learning unit 124 can classify the particular bill payment as an outlier (e.g., the user may have taken a vacation and spent extra fees that month). Statistical variance algorithms, such as Z-Index score, can be used. Machine learning unit 124 can extract features from an EDW of a financial institution (e.g., a bill payment gets paid, goes through one or more systems described herein such as data conversion systems and billing systems, is stored into an EDW, is retrieved by payment recovery platform 100 and stores the data internally, for example, in an elastic search database, where payment recovery platform 100 can extract from to use with AI microservice).

In some embodiments, data structures are converted from one data structure to another (e.g., SQL to JSON). Further improvements to the classification can be made through the Error Type Parameters/Error Occurred (True/False) parameters that can help adjust the one or more machine learning models' range of error detection.

In this way, payment recovery platform 100 is configured in these embodiments to provide pattern recognition on bill payments using the three features at the same time.

In some embodiments, machine learning unit 124 is configured to train one or more classification models for one or more of a variety of purposes, for example, including how to query EDW data (or other stored data) effectively for extracting information or data needed; select data from the query and provide it to a log API (e.g., that can be used to generate or manage data logs); enable modification of data accessible or generated using the log API into proper data structures (e.g., JSON); export data from one or more logs or sources using the log API and provide same to one or more databases (e.g., Elastic Search database); build an API that will expose data from the Elastic Search DB (e.g., for improved accessibility); write documentation for the API; call the API and select data for input into a machine learning micro service; select data using the API and generate data structures (e.g., organized into clusters) appropriate for data mining using the data; generate a self variation model for each payor; generate a cross variation model for every payor; update both models as time goes on or in real time (e.g., Online Learning); absorb data from both the models into making an anomaly prediction; package the prediction and expose it to other services or even back into the API (e.g., using field Predicated Correct Bill Payment set to NULL). In some embodiments, any one of a number of these features are implemented or facilitated by payment recovery platform 100 before or after machine learning (e.g., directly or indirectly, as an input to machine learning unit 124 or using an output from machine learning unit 124).

In some embodiments, normalization engine 122 (e.g., using machine learning unit 124) can generate self-variation or cross-variation models. Self-variation models can be generated when a payor has made their first bill payment. This model looks at the payor's previous payments to the same payee to see differences of variations between past and future payments. Normalization engine 122 can be configured to implement the generation of the models using business logic (e.g., for statically re-occurring payments) or data science (e.g., for dynamic re-occurring payments) with a focus on standard deviation/Z-Scores, for example. Cross-variation models can be generated when a group of users have made first bill payments to the same payee. This model can determine the average variation of previous payments from the cluster to identify deviations from the cluster that the user was associated with, for example, based on machine learning at machine learning unit 124.

In some embodiments, payment management unit 126 is configured to receive one or more classifications, predictions, and/or determinations relating to a particular data indicator and determine whether the data indicator is correct (e.g., by determining a relationship between the data indicator and the classification, prediction, and/or determination generated by the payment management unit 126. For example, if the data indicator value matches (or falls within a defined threshold) a prediction generated by machine learning unit 124, payment management unit 126 can be configured to update or generate a new data value denoting same. The new data value can be associated with the data indicator and provide a basis from which to determine that the data indicator is matches a prediction generated by payment recovery platform 100. For example, the new data value can be a flag or other variable, for example, stored in a data structure or as meta data.

In some embodiments, payment recovery platform 100 can provide technical computer advantages that allow machine learning unit 124 and payment management unit 126 to improve the client experience by reducing the number of incorrect bill payments. This may be through predictive detection of incorrect data received as input or through facilitating correct data input based on data predicted as suitable (e.g., correct). Such predictions can be based on machine learning using features representing or related to time (e.g., a particular month), payee patterns, and payor patterns (e.g. cross-variation of payor's transaction across all payee's payments from payors), for example.

In some embodiments, platform 100 is implemented in one or more large systems with scalable software, APIs, and machine learning/data science.

In some embodiments, platform 100 is configured to improve the client experience for users at a bank. Payment recovery is an industry-wide challenge and platform 100 can potentially create business value for a financial institution as users would have an added incentive to engage with the financial institution.

In some embodiments, data input engine 120 is configured to receive data from interface application 130, entities 150, data sources 160, databases 112, memory 108, and/or persistent storage 114. Processor 104 can be configured to retrieve the data or the data can be provided by a user via form fields in a form at interface application 130, for example.

In some embodiments, interface application 130 is configured to provide a visual, audio, or experiential interface with which a user may engage with payment recovery platform 100. The interface may be configured with one or more interface elements (e.g., static, dynamic, etc.) optimally positioned within the interface to provide or facilitate functionality (e.g., with predictive text or configuration of options based on data predicted as suitable given the data context). The interface application 130 can be configured for a mobile device (e.g., smartphone, tablet computer), computing device (e.g., desktop computer), and/or cloud-based device, for example. Interface application 130 may provide different access to different users, for example, based on a login attribute associated with the user. Different users can include a payor, a payee, a creditor, an administrator, and/or a bank, for example.

In some embodiments, payment recovery platform 100 at interface application 130 is configured to provide user interface for creditors, administrators or developers, institutions (e.g., banks), and clients that provides a visual experience of the data information.

In some embodiments, interface application 130 generates an interface laid out in a particular way to improve, enable, or facilitate data exchange or interaction with the platform.

In some embodiments, payment recovery system 100 is configured to enable a computing device to provide transaction recovery (e.g., bill payment recovery), geo-location clustering, and/or various other features, for example, using machine learning unit 124 or other engine/unit described herein. Examples of various features of payment recovery platform 100 will now be described.

Bill Payment Recovery

In some embodiments, machine learning unit 124 is configured to receive data indicators (e.g., tags) of all bill payments that have been marked as incorrect versus correct.

Examples of Feature A

In some embodiments, payment recovery system 100 can transform data (e.g., one or more datasets) into an object described in the example pseudocode below to cluster each data point into its respective month of payment.

```
{
    "January": {
        "Bill1": {
            "Payor Name": "Sally",
            "Payment Amount": 1200
        }
        "Bill2": {
            "Payor Name": "Jenifer"
        }
        "Bill3": {
            "Payor Name": "Bob"
        }
    }
}
```

Examples of Feature B

In some embodiments, payment management unit 126 is configured to process previous patterns of payment and identify if there is a large enough deviation from the norm. For example, in some embodiments, a deviation can be stored as a threshold data value or instructions to compute same, for example, based on other data or real-time inputs such as one or more characteristics associated with the user (e.g., payor, payee). Payment management unit 126 and, in some embodiments, as integrated with machine learning unit 124 (e.g., to receive a prediction of a correct value) can be configured to identify mistakes. For example, payment management unit 126 is configured to manage static cases, such as in the following data set: January: 50, February 50, March: 50, April: 100 (MISTAKE FOUND). As another example, payment management unit 126 is configured to manage dynamic cases, using one or more outputs from machine learning unit 124, such as in the following data set: January: 30, February: 45, March: 25, April: 85 (MISTAKE POSSIBLY FOUND).

As an example, static cases can be managed by payment recovery platform 100 using business logic to detect whether a payor has accidently typed in a wrong number when paying a bill payment.

As an example, dynamic cases can be managed by payment recovery platform 100 using machine learning unit 124, especially where a bill payment is constantly changing and it may be hard to detect when a mistake is made when the mistake is very close to the average deviations that are usually made. For example, If payor A in January pays 50 and in February pays 58, then no error may be occurring; payor A might just be using more data that month on her phone plan. But if in March we see 55 and then in April we see 72 then payment management unit 125 (using machine learning unit 124) may be configured to raise a flag, for example, indicating an error. The platform 100 can prompt the user to confirm whether there is an error present. Upon confirmation, machine learning unit 124 is configured to reinforce in one or more models that 72 is out of the standard or correct range. But if the user says there was no error, then machine learning unit 124 is configured to decrease its error scope so that, for example, if the bill payment in May is 75, payment management unit 126 will not flag an error to the user.

As another example, in static implementations, where 50 is received multiple times, the bill payments should always be 50. In dynamic implementations, where a range of numbers are received, the bill payments should always be within the range of numbers.

In some embodiments, static and dynamic implementations may be combined.

In some embodiments, where payment management unit 126 or machine learning unit 124 does not identify a mistake, data feedback can be provided to machine learning unit 124 and/or payment management unit 126 and same can be configured to adjust their sensitivity appropriately.

Examples of Feature C

In some embodiments, payment management unit 126 is configured to assess one or more bill payments (e.g., from different payors) and find the average amount of all of them (e.g., after certain processing such as removing outliers) then checking the variance of their average (e.g., using one or more models generated by machine learning unit 124) versus the specific payor's bill payment amount. The variance of their average can be determined using machine learning unit 124 that can determine appropriate patterns in the data that can be used for comparison.

For example, given the following data: Payor A: 50, Payor B: 70, Payor C: 40, Payor D: 10, payment management unit 126 is configured to determine that a mistake is possibly found at Payor D: 10 because Payor D is paying less than the actual bill amount. As another example, where Payor D: 200, payment management unit 126 is configured to determine that a mistake is found because Payor D is paying more than everyone else.

As another example, given the following data: Payor A: 50, Payor B: 50, Payor C: 50, Payor D: 60, Next Month Payor A: 50, Payor B: 50, Payor C: 50, Payor D: 60, payment management unit 126 is configured to determine that there is a mistake at Payor D: 60, as Payor D is paying $10 more than average, so Payor D may be continuously overpaying their bill every month.

In these examples, the determination of a mistake can be based on a predicted payment amount generated by machine learning unit 124 (e.g., based on self variation and/or cross variation patterns, other patterns related to data associated with each payor/payee) for each payor and comparison with the actual amount paid by each payor.

In some embodiments, payment recovery platform 100 is configured to collect, store, organize, and/or process data. The system can collect data from all bill payments passing through a financial institution system (e.g., interconnected with payment recovery platform 100) where it can be converted into a machine learning digestible format (e.g., via normalization engine 122); store the data (or converted data) on one or more databases (e.g., secure elastic search databases); and organize and process the data (e.g., including generating new data or metadata). For example, for re-occurring and dynamic bill payments made to a payee, payment recovery platform 100 can be configured to perform two things. First, payment recovery platform 100 can cluster every payor accordingly based on their similarities to other payors (e.g., if payor A has a sequence of {22, 25, 23, 19, 21} and payor B has a sequence of {55,44,46,58,50} and payor C has a sequence of {15,18,17,21,12} then only payor A and payor C will be clustered). Through the clustering of all payors, payment recovery platform 100 can be configured to detect when a deviation from the cluster occurs and notify a user immediately (e.g., via an interface application 130) that there is a possibility of an incorrect bill payment occurring. Machine learning unit 124 can be used to cluster the data as well as to detect or process deviations of a payor away from a cluster.

Geo-Location Clustering of Payee's Account Number(s)

In some embodiments, payment management unit 126 is configured to implement geo-location clustering of a payments, for example, of a payee's account number(s).

In some cases, payors may be unable to add or select the correct payee's account when first setting up their bill payment. This may be attributed to the payee having multiple accounts that are region based accounts per payee (e.g., Utility Company X—Nova Scotia or Utility Company X—PEI). In an interface that displays all payees for all regions, a payee located in Toronto may erroneously select Utility Company X—NS (Nova Scotia) because they may not understand the acronym and think that since it showed up on a user interface it must be an applicable payee to select. Similarly, a payee located in Halifax may select the incorrect payee, Utility Company X—PEI, as they may assume that all payments go to Utility Company X eventually, so the corresponding province does not affect the bill payment.

By using a cluster analysis of the payments being made in a payor's area or geo location of the payees near the targeted payee, payment recovery platform 100, in some embodiments, is configured to simplify the selection options and curate the options for display based on what the other payees are paying in that area. In some embodiments, the selection options shown when one tries to add a payee are simplified. In the case of a Utility Company X payment, for example, payment recovery platform 100 can display choices based on the payments made by other clients and flag any anomalies to the user. For example, if Jane's neighbors make payments to Utility Company X—Nova Scotia and she attempts to pay Utility Company X—PEI, we can identify this as a potential error and ask Jane to confirm the payment before it is processed by a client system interconnected with payment recovery platform 100.

Payment recovery platform 100 is configured to implement advanced business logic and a modified PageRank algorithm that is geo-location based. This can allow a computer to efficiently provide appropriate data values for selection by a user, without manually hardcoding values e.g., if Payee's Geo-Location==Halifax, set available options to Rogers—Nova Scotia). This further allows for a dynamic user interface for ever changing users (e.g., payees), for example, based on location (or other feature).

The following is an illustrative example according to some embodiments. As an example, Toronto was clicked 50 times for people in this radius and Nova Scotia was clicked 5 times by people in a different radius, thus, payment management unit 126 is configured to rank and cause display of Toronto as being higher than Nova Scotia. If the user selects Nova Scotia by accident, payment management unit 126 can be configured to alert them that Nova Scotia may not be the bill they are trying to pay and recommend the correct one based on a prediction from machine learning unit 124 or a correct result determined by payment management unit 126. In some embodiments, interface application 130 is configured to auto-fill revised payee information or other information (e.g., correct city for bill payment), for example, based on the payor and related data.

In some embodiments, platform 100 can be used in credit card payments and/or fraud detection applications.

Referring to embodiments illustrated in FIG. 1, the platform 100 connects to interface application 130, entities 150, and data sources 160 (with databases 170) using network 140. Entities 150 can interact with the platform 100 to provide data, for example, financial, account, payment, location, and/or attribute(s) data, and/or meta data of same. Entities 150 can interact with the platform 100 to receive output data. Network 140 (or multiple networks) is capable of carrying data and can involve wired connections, wireless connections, or a combination thereof. Network 140 may involve different network communication technologies, standards and protocols, for example. The interface application 130 can be installed on a user device to display an interface of visual elements that can represent classifications, results, reporting, and so on.

The platform 100 can receive a large amount of data from different entities 150 (e.g., network entities, network endpoints). The platform 100 can process the data. In some embodiments, the processor 104 is further configured to generate visual elements. The platform 100 is operable to analyze and process the data created or collected by one or more entities 150 or data sources 160.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, a type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112, and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities 150.

Memory 108 may include a suitable combination of a type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 110 can include memory 108, databases 112, and persistent storage 114.

Each communication interface 106 can enable the payment recovery platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including a combination of these.

The payment recovery platform 100 can be operable to register and authenticate users (using a login, unique identifier, and password for example) prior to providing access to applications, a local network, network resources, other networks and network security devices. The platform 100 may serve one user or multiple users.

The storage 112 may be configured to store information associated with or created by the storage device 110. Storage 112 and/or persistent storage 114 may be provided using various types of storage technologies, such as solid state drives, hard disk drives, flash memory, and may be stored in various formats, such as relational databases, non-relational databases, flat files, spreadsheets, extended markup files, etc.

Figure 2:
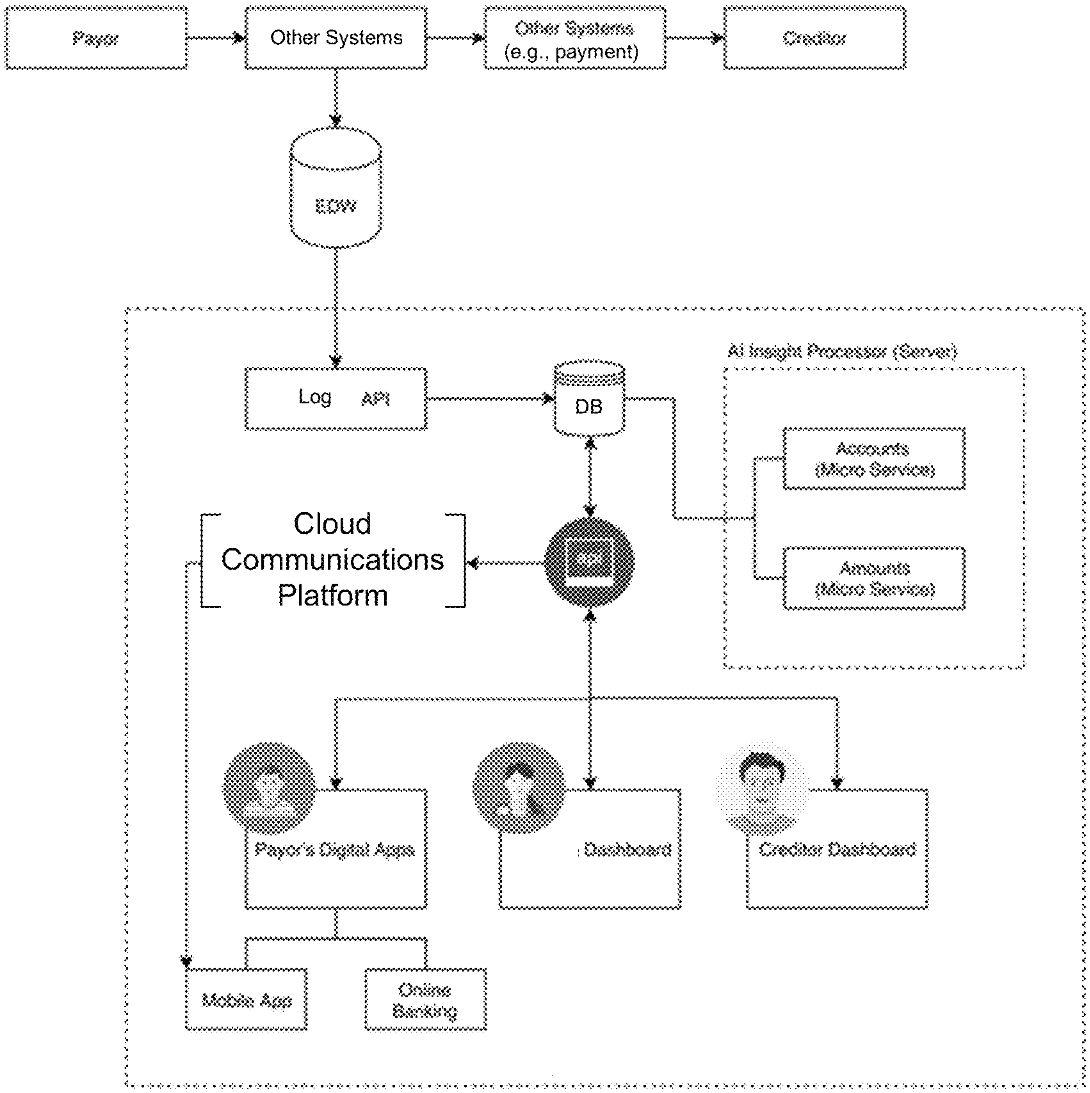
FIG. 2 is a schematic diagram of an example payment recovery platform according to some embodiments.

FIG. 2 is a schematic diagram of an example payment recovery platform 100, according to some embodiments. In some embodiments, payment recovery platform 100 receives data from a payor and stores same in an enterprise data warehouse (EDW). In some embodiments, the data is stored in the EDW by another platform and payment recovery platform 100 is configured to receive (e.g., retrieve, access) the data from the EDW. In some embodiments, the payor may interact with other systems (e.g., payment systems that send bills to creditors on a batch basis), for example, to provide payment or assess payment with a creditor (e.g., payee). In some embodiments, a payor can engage with a system (e.g. B7) that takes in bill payment data from various sources such as ATMs, faxes, online banking, and mobile applications and provides same to a format converter (e.g., WTX). The format converter can convert files (e.g., XML, other file types) into EDI. In some embodiments, the payor can engage with a system that debits/credits bank accounts as appropriate (e.g., DDRA). Any one of these systems can interoperate with payment recovery platform 100, for example, as entities 150 or as systems that generate data stored in data sources 160 that can be accessed by payment recovery platform 100.

In some embodiments, electronic interaction data (e.g., bill payment data) is transmitted within a financial institution's computer system and stored in an EDW. From the EDW (e.g., stored in SQL format), payment recovery platform 100 can be configured to receive data using a data log system and convert the data to a different format (e.g., JSON). The data, for example, as an JSON object, can be stored in one or more databases accessible using elastic search. Payment recovery platform 100 is configured to receive the data (e.g., using a machine learning microservice that can pull the data), cluster the data, process the data, and/or generate and append additional data to the data (e.g., additional values to the JSON object). Payment recovery platform 100 can be configured to transmit the data to one or more elastic search databases for storage. If during clustering/processing of the data, payment recovery platform 100 detects an error (e.g., a bill payment error), the platform 100 can be configured to send a notification (e.g., SMS Message, JSON object through network) to a user (e.g., engaged at interface application 130) to fix the payment immediately.

In this way, the data can be transferred through layers of classification and processing, including a business logic layer, self-variation machine learning Layer (e.g., implementing data science and detection), and a cross-variation machine learning layer (e.g., implementing clustering and detection).

In some embodiments, payment recovery platform 100 is configured to implement elastic search (e.g. searching for specific bill payments can take minimal time), log API or systems (e.g., improves or optimizes receipt or storage of transaction data such as bill payments that are received from different locations in the system; allows data structure of same to be transformed to include additional or modified data and allows for storage), and various other systems that provide functionality such as visualization of bill payments data easily to find correlations (e.g., using machine learning), integration of site search into an interface application (e.g., dashboard) to assist with bill payment related searching, prevention or reduction of data flooding of systems through security holes and using analytics to detect anomalies such as a high rate of bill payment errors within a certain time frame (e.g., all of a sudden), update of a user interface in real-time using such data, data visualization engine functionality, RESTful API, and various computing and analytics functionality (e.g., ES-Hadoop connected with Apache Spark).

In some embodiments, payment recovery platform 100 (e.g., at data input engine 120 and/or normalization engine 122) is configured to implement and/or use a log API that can, for example, monitor data changes in an EDW or database and generate one or more logs or data summaries related to same. Data input engine 120 can store same (e.g., logs, meta data related to same) in one or more databases, which can provide access (e.g., through an API) to its data to one or more dashboards, users, digital applications, cloud communications platforms, or other data access points, including payment recovery platform 100. A log API can accept data directly from one or more databases (e.g., EDW) and convert same into JSON or provide other suitable data conversion functionality. The log API can accept data from other entities (e.g., financial institutions) and tag same with the financial institution identity during conversion, for example. The one or more databases (e.g., databases 112) can provide elastic search functionality and can store all bill payments from every source and modified bill payments generated following modification using the log API.

A user (e.g., payor) can access the data (e.g., through payment recovery platform 100) via a mobile application or online banking application through the cloud communications platform, for example. Such functionality can be provided by payment recovery platform 100 as described herein. In some embodiments, interface application 130 is configured to provide one or more dashboards, for example, each selectively accessible after authentication of a user with appropriate permissions. An administrator and a creditor can access separate dashboards to engage with payment recovery platform 100, for example, to view payors that owe the creditor money, to view incoming transactions, to request payment from one or more payors, to view patterns in their data, to assess one or more attributes of their financial account, etc. A creditor, via a creditor-enabled dashboard (e.g., authenticated via login information), can engage with payment recovery platform 100 to allow the creditor to view all relevant bill payment information (e.g., which bank did a bill payment come from, contact information, etc.), authorize debits without filling out a form or using a payer copy, and issue errors and track statuses. An administrator dashboard can provide direct alerts by allow access of data corresponding to a corporate creditor and a user so that information regarding both clients can be managed by an active user. A web or mobile dashboard can provide alerts to a user (e.g., payor) that there is a bill payment error, allow for instant resolution and escalation within the application, and receive confirmation of any issue requests that are processed, including status tracking.

Figure 3:
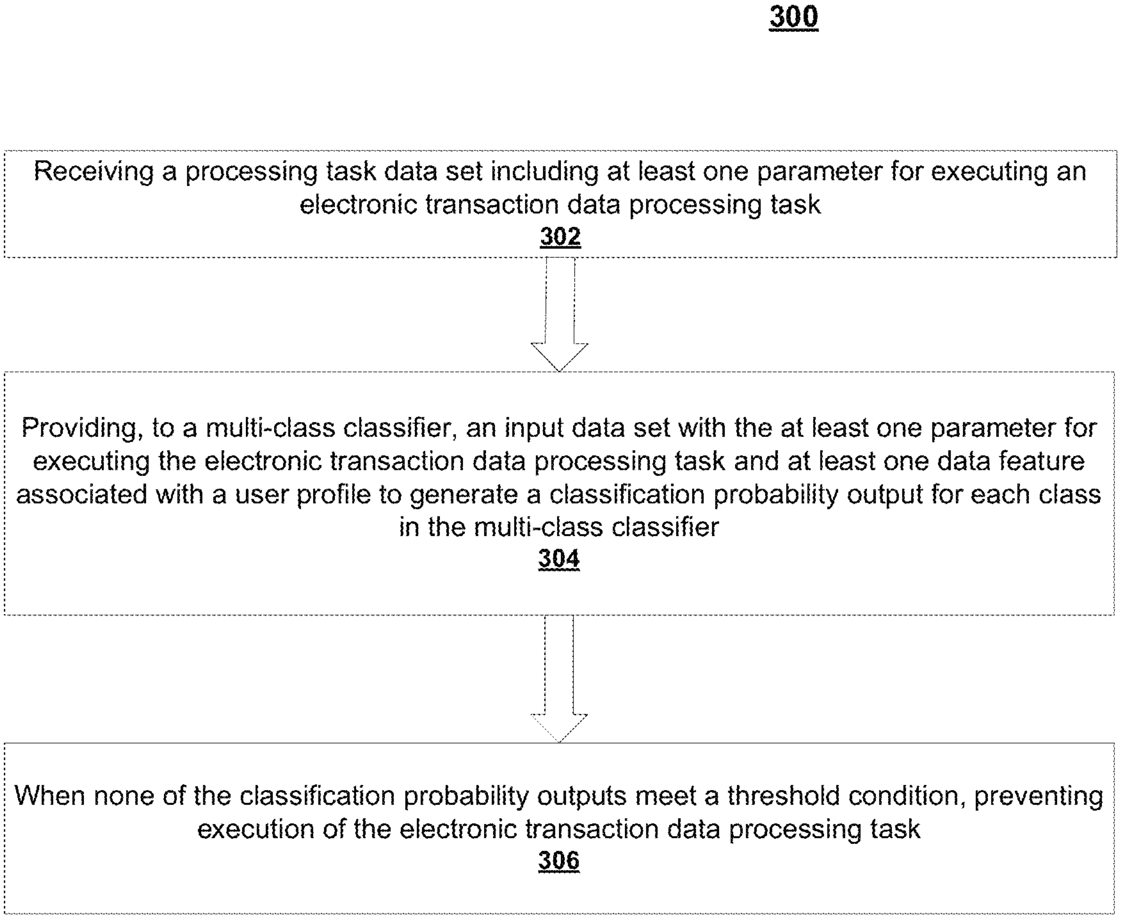
FIG. 3 is a flowchart showing aspects of an example method for intercepting potentially erroneous electronic transaction data processing tasks.

In accordance with aspects of the present disclosure described herein or otherwise, in FIG. 3 shows aspects of an example method 300 for identifying or intercepting potentially erroneous electronic transaction data processing tasks.

At 302, or more processors are configured to receive a processing task data set. In some embodiments, the processing task data set includes one or more parameters for executing an electronic transaction data processing task. In some embodiments, an electronic transaction data processing task is or is part of a data process for executing an electronic transaction such as an electronic transfer of funds (e.g. an electronic bill payment). In some embodiments, for electronic transaction data processing task includes adding a payee or otherwise associated associating payee with a user profile.

In some embodiments, the processor presents a user interface for receiving data for the processing task data set. For example, an online banking webpage or mobile making application can include a user interface which includes a number of fields which can be inputted by a loser using input device. User interface elements for receiving these fields include pulldown menus, radio buttons, selectable lists, text fillable fields, and/or any other suitable user interface element for receiving inputs.

In some embodiments, the fields include a payee name, a date of payment, and a payment amount.

In some embodiments, the processing task data set is received in conjunction with the request to execute electronic transaction data processing task. In some embodiments, the request is received when a user submits a transaction request such as by clicking a submit or proceed button on a user interface for paying an bill.

In some embodiments, the processing task data set is received before a request to execute electronic transaction data processing task is received. For example, the processing task data set or portions of it can be received as soon as a user starts inputting data into one or more fields but has not yet provided in an input to trigger a request (i.e. has not clicked a submit button). In this manner, some embodiments, the system can by potentially erroneous data entries in real-time before all data fields have been billed or before a submit or other similar button has been clicked.

In some embodiments, the processing task data set is received in a recurring bill payment or an input to pay a bill (i.e. Rather than individual fields being inputted by the user, the processing task data set is received as part of a request to pay majority includes all of the processing task data set values).

At 304, the processor provides, to a multiclass classifier, in the input data set with at least one parameter from the processing task data set for executing electronic transaction data processing task. In some embodiments input data set also includes at least one data feature associated with a user profile. In some embodiments, a data feature associated with the user profile can include a secure location associated with the user profile and/or demographic information associated with the user profile. For example, a customer's address associated with a user profile can be part of the input data set. In some embodiments, an address can be in the form of a street address. In some embodiments, an address can be in the form of latitude and longitude values or can be converted by the processor into these values.

In some embodiments, the multiclass classifier generates a classification probability for each class in the multiclass classifier.

In some embodiments, the multiclass classifier is based on an unsupervised clustering and dimensions associated with data fields in the processing task data set or data fields associated with the user profile. In some embodiments, the multiclass classifier is created by clustering historically correct bill payments, and training the classifier using the clusters as labeled data. This trained classifier is then used to classify a new electronic transaction data processing task (e.g. a bill payment request).

Classifying bill payments as correct and incorrect has traditionally been difficult since the distribution might not be stationary over time (bill payment pattern changes from season to season). In some embodiments, to address this challenge, an unsupervised clustering technique is employed using the following features of correct bill payments:

a. Payee—payees that are related should have a higher probability of being clustered together. To achieve this result, the system combine meta-data called payee category (eg. Utilities, Telecom, Taxes etc.) with the actual payee id itself and feed that into a hashing function h. The hashing function generates numerical values that are close for payee that have the same categories. An example, hashing function is of the form:

$$h = h1(\text{payee category})*10000 + h2(\text{payee name}),$$

this hashing function h minimizes Euclidean distances between 2 payees that are from the same category. Other suitable hashing functions can be used.

b. Date of bill payment—Bill payments are cyclical in nature, so in some embodiments, the bill payment is transformed into a numerical value that represents days of the year from 0 . . . 365
c. Payment Amount
d. Geo-location—longitude and latitude or other suitable values Clustering is then conducted using the above 4 dimensions. In some embodiments, density-based spatial clustering of applications with noise (DBSCAN) is employed for clustering as it does not require the number of classes to be specified as an input to the model. Testing showed that DBSCAN with an epsilon value of 2 and MinPoints value of 5 were particularly effective. Other embodiments can use other values of epsilon and MinPoints, or another clustering algorithm. In some embodiments, the algorithm is an algorithm which does not require the number of classes as input.

After clustering is complete using DBSCAN, a multiclass classifier is trained using the clusters as labels. For example, if 5 clusters c1, . . . , c5 are produced by DBSCAN the members of these clusters will be given labels c1 or c2 or c3 or c4 or c5 as appropriate. In one embodiment, a 5/32/32/k neural network is used, where k is the number of clusters identified by DBSCAN on input data. The input layer consists of 5 nodes representing the 4 features described previously (payee, date of bill payment, amount and geo-location (long/lat). The second layer is a 32 node dense layer with Relu as its activation function, followed by a dropout layer with dropout factor 0.25. Finally the output layer has k nodes with Softmax as its activation function. The loss function employed was categorical cross-entropy, where stochastic gradient descent was used as the optimization method. The network was trained over 200 epochs with mini-batch size of 32.

Once the network is trained to satisfaction, it is used to classify new incoming bill payments into one of the k labels. In some embodiments, the system is configured to deem a bill payment as potentially invalid if: "for all classes Ki, none of the probability output by the network is above a threshold T where T=0.9". In other words, a bill that is successfully classified into one of the identified labels are deemed okay, while one that is not will be flagged as potentially erroneous.

In some embodiments, another multi-class classifier can be trained by the output of the clustering algorithm, for example in another embodiment a softmax regression can be used.

If any of the classification probability outputs meets the threshold condition (e.g. T=>0.9), the processor transmits electronic transaction data processing task for execution.

At 306, wherein none of the classification probability outputs meets threshold condition, the processors prevent the execution of the electronic transaction data processing task. In some embodiments, preventing the execution includes generating signals for displaying on a user interface or otherwise communicated to a user that one or more parameters in the processing of data task set may be erroneous. For example, a bill payment user interface including input fields can display a warning message indicating that the currently inputted set of values may include an error. In some embodiments, the warning message may identify which of the set of values is likely erroneous.

In some embodiments, the processors and prevent the execution of the electronic transaction data processing task until the inputted set of values are corrected or are otherwise not flagged as being erroneous, or when a using input is received indicating that potentially erroneous electronic transaction data processing task is to be executed (i.e. confirming that the transaction should proceed despite the flagged potential error).

In some embodiments, when a processing task data set is received in a manner not involving a user inputting individual parameter fields, the processors can block execution of the electronic transaction data processing task and a message (e.g. email, messaging application, message in an online banking webpage, mobile banking application, etc) can be sent to an account associated with the user profile. In some embodiments, the processors can transmit the task for execution once a positive acknowledgement is received to proceed with the task in response to the message.

In some embodiments, the system can be used to detect errors when adding a new payee to a bill payments profile or process. It is found that multi-regioned payees are a large source of errors when users are submitting bill payments (for example, Rogers—Nova Scoatia vs Rogers—PEI). This is largely due to the naive UI where candidate payees are presented to the user (for example, in a drop down box) purely based on the search string similarity. For example, when a user searches for "Rogers", a drop down box might display "Rogers—Nova Scotia, Rogers—PEI, Rogers Ontario" in no particular order. This technique employs unsupervised clustering on historically correct bill payments on geo-location and payee, so that the payee with the highest likelihood of being correct is presented first to the user at the time of issuing a bill payment. The algorithm works in the following manner:

a. Conduct unsupervised clustering on all historically correct bill payments to multi-regioned payees. The input feature used is simply the payee id and geolocation (in the form of long lat). Any unsupervised clustering algorithm can be used, but in some embodiments, it is preferable to select one that does not require the number of classes as a training parameter. In one embodiment, DBSCAN can be used as the clustering algorithm.
b. When a user initiates a bill payment to a multi-regioned payee, a proximity based spatial query is done on the clustered data based on the user's residential location. The clusters that are returned are then used to rank the naïve string match to perculate the payee that has a higher likelihood to be correct to the top of the drop down box. Abstractly, a query of the form "Select clusterName where cluster c is within radius r of x, y and clusterName—search term". For example, let's say the search term "Rogers" yielded "Rogers—Nova Scotia, Rogers—PEI, Rogers Ontario" based on a string similarity search. A proximity search is then conducted on the clusters on x, y, where x, y is the residential location of the user. In this example, the proximity search returned labels "Rogers Ontario, Bell Ontario", thus the algorithm will give Rogers Ontario a higher ranking than the other variants of Rogers. In one embodiment where a drop down box is used to present payees to the user for selection, "Rogers Ontario" will be bumped to the top of the list.

In accordance with the above or otherwise, and with reference to FIG. 3, when electronic transaction data processing tasks to the associated new payee to the user profile, the method includes conducting a proximity search of clusters based on the geolocation associated with the user profile to identify one or more payee names having a highest ranking, and generating signals for displaying the identified one or more payee names more prominently on a user interface for selection. For example, payee names having a highest ranking can be displayed first in a list or can be automatically highlighted/bolded/etc. or selected by default.

In some embodiments, if a payee name which is not one of the highest ranking names is selected, the processors can prevent the execution of the transaction data processing task (i.e. can prevent adding of the payee) until this potentially flagged error is fixed or input is received acknowledging or confirming selection of this payee.

In some embodiments, payment recovery platform 100 is configured to implement an artificial intelligence insight processor (e.g., at one or more remote servers) and provide one or more various other services for interoperability between components therein. For example, payment recovery platform 100 can be configured to provide an accounts micro service and/or an amounts micro service, which can generate and/or update data for storage in the one or more databases and/or store data in same, for example, for use by a component included in payment recovery platform 100, such as normalization engine 122, machine learning unit 124, and/or payment management unit 126. For example, machine learning unit 124 can implement the accounts and amounts micro services such that machine learning unit 124 generates predictions for correct bill payment amounts, payee/payor account numbers, and/or timing of payments based on patterns in previous related data (e.g., self variation or cross variation data models for a payee and/or payor). In some embodiments, machine learning unit 124 is configured to, via an accounts micro service, identify incorrect account numbers that were paid to by a payor. In some embodiments, machine learning unit 124 is configured to, via an amount micro service, identify incorrect amount values that were paid to by a payor. The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Applicant notes that the described embodiments and examples are illustrative and non-limiting. Practical implementation of the tools may incorporate a combination of some or all of the aspects, and systems or devices described herein should not be taken as indications of future or existing product plans. Applicant partakes in both foundational and applied research, and in some cases, the aspects described are developed on an exploratory basis.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-implemented system for intercepting potentially erroneous electronic transaction data processing requests, the system comprising a processor and a memory storing machine executable instructions to configure the processor for:

training a multi-class classifier using a plurality of clusters as labelled data, wherein the plurality of clusters are formed from performing unsupervised clustering on historical data sets of executed electronic transaction data processing requests, wherein the unsupervised clustering comprises density-based spatial clustering of applications with noise to handle irregular distributions in data sets such that the multi-class classifier does not require a number of classes to be specified as an input to the multi-class classifier;

receiving an electronic transaction data processing request including an input data set and at least one parameter for executing the electronic transaction data processing request;

providing, to the multi-class classifier, the input data set with the at least one parameter for executing the electronic transaction data processing request and at least one data feature associated with a user profile;

performing, by the multi-class classifier, multi-class classification based on a plurality of dimensions associated with a plurality of data fields in the input data set to generate a classification probability output for each class in the multi-class classifier, wherein at least one of the dimensions is processed using a hash function;

when none of the classification probability outputs meet a threshold condition, generating signals to prevent execution of the electronic transaction data processing request and communicate to the user that at least one parameter for executing the electronic transaction data processing request is erroneous;

when at least one of the classification probability outputs meets the threshold condition, transmitting the electronic transaction data processing request for execution, wherein execution of the electronic transaction data processing request comprises:

conducting a similarity search on the classes in the multi-class classifier based on the at least one parameter in the electronic transaction data processing request to obtain a ranked list of classes;

generating a first plurality of signals for rendering a user interface on a display, the rendered user interface comprising a first selection user interface element for displaying a highest ranked class from the ranked list of classes more prominently than other classes from the ranked list of classes; and transmitting the first plurality of signals to a user device for rendering the user interface including the first selection user interface element for selection by the user;

wherein the multi-class classifier is based on an unsupervised clustering on the plurality of dimensions associated with the plurality of data fields in the input data set or data fields associated with the user profile; and wherein the electronic transaction data processing request is to add a new payee to the user profile or to add a new payee during a payment process, the electronic transaction data processing request comprising:

receiving a user query from the user device, the user query comprising a string input associated with the new payee;

conducting a search based on the string input associated with the new payee to obtain a plurality of payee data values, each in a different geographical region;

conducting a proximity search on geo-clusters based on a geo-location of the user associated with the user profile;

when the plurality of payee data values comprise at least two payee names that indicate a same payee entity, wherein each of the at least two payee names is located in a different geographical region, identifying a payee name from the at least two payee names based on the user query by determining that the identified payee name is physically located closer to the geo-location of the user than at least one other payee name from the at least two payee names;

generating a second plurality of signals for rendering the user interface on the display, the rendered user interface comprising a second selection user interface element for displaying the identified payee name more prominently than other payee data values; and transmitting the second plurality of signals to the user device for rendering the user interface including the second selection user interface element for selection by the user.

2. The system of claim 1, wherein the input data set is received via one or more input fields on the user interface.

3. The system of claim 2, wherein generating signals to prevent the execution of the electronic transaction data process request comprises generating signals for outputting a message via the electronic transaction data processing request user interface, the message indicating that at least one aspects of the input data set is potentially erroneous.

4. The system of claim 1, wherein the instructions configure the processor for: transmitting the electronic transaction data processing request for execution when:

an input is received indicating that the potentially erroneous electronic transaction data processing request is to be executed.

5. The system of claim 1 wherein the electronic transaction data processing request is for executing an electronic bill payment, and wherein the dimensions include at least one of: a payee, a date of bill payment, a payment amount, or the geo-location associated with the user profile.

6. The system of claim 1, wherein at least one data feature associated with a user profile comprises at least one of: the geo-location and a user demographic.

7. The system of claim 1, wherein the instructions configure the processor for:

conducting the unsupervised clustering and training the multi-class classifier using the clusters as labels.

8. A computer-implemented method for intercepting potentially erroneous electronic transaction data processing requests, the method comprising:

training a multi-class classifier using a plurality of clusters as labelled data, wherein the plurality of clusters are formed from performing unsupervised clustering on historical data sets of executed electronic transaction data processing requests, wherein the unsupervised clustering comprises density-based spatial clustering of applications with noise to handle irregular distributions in data sets such that the multi-class classifier does not require a number of classes to be specified as an input to the multi-class classifier;

receiving, by a processor, an electronic transaction data processing request including an input data set and at least one parameter for executing the electronic transaction data processing request;

providing, by the processor, to the multi-class classifier, the input data set with the at least one parameter for executing the electronic transaction data processing request and at least one data feature associated with a user profile;

performing, by the multi-class classifier, multi-class classification based on a plurality of dimensions associated with a plurality of data fields in the input data set to generate a classification probability output for each class in the multi-class classifier, wherein at least one of the dimensions is processed using a hash function;

when none of the classification probability outputs meet a threshold condition, generating signals, by the processor, to prevent execution of the electronic transaction data processing request and communicate to the user that at least one parameter for executing the electronic transaction data processing request is erroneous;

when at least one of the classification probability outputs meets the threshold condition, transmitting the electronic transaction data processing request for execution, wherein execution of the electronic transaction data processing request comprises:

conducting a search on the classes in the multi-class classifier based on the at least one parameter in the electronic transaction data processing request to obtain a ranked list of classes;

generating a first plurality of signals for rendering a user interface on a display, the rendered user interface comprising a first selection user interface element for displaying a highest ranked class from the ranked list of classes more prominently than other classes from the ranked list of classes; and transmitting the first plurality of signals to a user device for rendering the user interface including the first selection user interface element for selection by the user;

wherein the multi-class classifier is based on an unsupervised clustering on the plurality of dimensions associated with the plurality of data fields in the input data set or data fields associated with the user profile; and wherein the electronic transaction data processing request is to add a new payee to the user profile or to add a new payee during a payment process, the electronic transaction data processing request comprising:

receiving a user query from the user device, the user query comprising a string input associated with the new payee;

conducting a search based on the string input associated with the new payee to obtain a plurality of payee data values, each in a different geographical region;

conducting a proximity search on geo-clusters based on a geo-location of the user associated with the user profile;

when the plurality of payee data values comprise at least two payee names that indicate a same payee entity, wherein each of the at least two payee names is located in a different geographical region, identifying a payee name from the at least two payee names based on the user query by determining that the identified payee name is physically located closer to the geo-location of the user than at least one other payee name from the at least two payee names;

generating a second plurality of signals for rendering the user interface on the display, the rendered user interface comprising a second selection user interface element for displaying the identified payee name more prominently than other payee data values; and transmitting the second plurality of signals to the user device for rendering the user interface including the second selection user interface element for selection by the user.

9. The method of claim 8, wherein the input data set is received via one or more input fields on the user interface.

10. The method of claim 9, wherein generating signals to prevent the execution of the electronic transaction data process request comprises generating signals for outputting a message via the user interface, the message indicating that at least one aspects of the input data set is potentially erroneous.

11. The method of claim 8, comprising: transmitting the electronic transaction data processing request for execution when:

an input is received indicating that the potentially erroneous electronic transaction data processing request is to be executed.

12. The method of claim 8 wherein the electronic transaction data processing request is for executing an electronic bill payment, and wherein the dimensions include at least one of: a payee, a date of bill payment, a payment amount, or the geo-location associated with the user profile.

13. The method of claim 8, wherein at least one data feature associated with a user profile comprises at least one of: the geo-location and a user demographic.

14. A non-transitory computer-readable medium having stored thereon machine-interpretable instructions, which when executed by a processor, cause the processor to perform:

training a multi-class classifier using a plurality of clusters as labelled data, wherein the plurality of clusters are formed from performing unsupervised clustering on historical data sets of executed electronic transaction data processing requests, wherein the unsupervised clustering comprises density-based spatial clustering of applications with noise to handle irregular distributions in data sets such that the multi-class classifier does not require a number of classes to be specified as an input to the multi-class classifier;

receiving a electronic transaction data processing request including an input data set and at least one parameter for executing the electronic transaction data processing request;

providing, to the multi-class classifier, the input data set with the at least one parameter for executing the electronic transaction data processing request and at least one data feature associated with a user profile;

performing, by the multi-class classifier, multi-class classification based on a plurality of dimensions associated with a plurality of data fields in the input data set to generate a classification probability output for each class in the multi-class classifier, wherein at least one of the dimensions is processed using a hash function;

when none of the classification probability outputs meet a threshold condition, generating signals to prevent execution of the electronic transaction data processing request and communicate to the user that at least one parameter for executing the electronic transaction data processing request is erroneous;

when at least one of the classification probability outputs meets the threshold condition, transmitting the electronic transaction data processing request for execution, wherein execution of the electronic transaction data processing request comprises:

conducting a search on the classes in the multi-class classifier based on the at least one parameter in the electronic transaction data processing request to obtain a ranked list of classes;

generating a first plurality of signals for rendering a user interface on a display, the rendered user interface comprising a first selection user interface element for displaying a highest ranked class from the ranked list of classes more prominently than other classes from the ranked list of classes; and transmitting the first plurality of signals to a user device for rendering the user interface including the first selection user interface element for selection by the user;

wherein the multi-class classifier is based on an unsupervised clustering on the plurality of dimensions associated with the plurality of data fields in the input data set or data fields associated with the user profile;

wherein the electronic transaction data processing request is to add a new payee to the user profile or to add a new payee during a payment process, the electronic transaction data processing request comprising:

receiving a user query from the user device, the user query comprising a string input associated with the new payee;

conducting a search based on the string input associated with the new payee to obtain a plurality of payee data values, each in a different geographical region;

conducting a proximity search on geo-clusters based on a geo-location of the user associated with the user profile;

when the plurality of payee data values comprise at least two payee names that indicate a same payee entity, wherein each of the at least two payee names is located in a different geographical region, identifying a payee name from the at least two payee names based on the user query by determining that the identified payee name is physically located closer to the geo-location of the user than at least one other payee name from the at least two payee names;

generating a second plurality of signals for rendering the user interface on the display, the rendered user interface comprising a second selection user interface element for displaying the identified payee name more prominently than other payee data values; and transmitting the second plurality of signals to the user device for rendering the user interface including the second selection user interface element for selection by the user.

15. The system of claim 1, wherein the identified payee name represented in the second selection user interface element has a highest ranking based on the geo-clusters from the proximity search.

16. The method of claim 8, wherein the identified payee name represented in the second selection user interface element has a highest ranking based on the geo-clusters from the proximity search.

* * * * *